United States Patent [19]

Rice

[11] Patent Number: 4,548,798

[45] Date of Patent: Oct. 22, 1985

[54] LASER SYNTHESIS OF REFRACTORY OXIDE POWDERS

[75] Inventor: Gary W. Rice, Whitehouse Station, N.J.

[73] Assignee: Exxon Research and Engineering Co., Florham Park, N.J.

[21] Appl. No.: 601,079

[22] Filed: Apr. 16, 1984

[51] Int. Cl.[4] ...................... C01B 33/18; C01B 35/10; C01F 17/00; C01G 23/047

[52] U.S. Cl. .................................. 423/263; 423/278; 423/335; 423/606; 423/607; 423/608; 423/610; 423/625; 423/636

[58] Field of Search ................. 204/157.1 R, 157.1 L, 204/278; 423/610, 335, 625, 608, 263, 606, 607, 636

[56] References Cited

U.S. PATENT DOCUMENTS 4,343,687  8/1982  Ronn ........................... 204/157.1 R Primary Examiner—Howard S. Williams
Attorney, Agent, or Firm—Ronald D. Hantman

[57] ABSTRACT

The present invention relates to a method for the production of refractory oxide powders by pyrolyzing with laser energy a metal- and oxygen-containing organic chemical species characterized by the following properties: (a) some or all of the organic fragments (ligands) are bound to the metal by one or more metal-oxygen bonds, (b) the chemical species is able to absorb laser energy, preferably from a $CO_2$ laser, in a vibrational mode, (c) the chemical species can be obtained in a gas state, at a temperature below the decomposition temperature.

11 Claims, 2 Drawing Figures

GAS INLET SYSTEM

LASER SYNTHESIS OF REFRACTORY OXIDE POWDERS

BACKGROUND OF THE INVENTION

The present invention relates to a method for the production of refractory oxide powders by pyrolzying with laser energy a boron, silicon-, or metal-containing organic chemical species characterized by the following properties: (a) some or all of the organic fragments (ligands)are bound to the boron, silicon or metal by one or more boron-, silicon-, or metal-oxygen bonds, (b) the chemical species is able to absorb laser energy, preferably from a $CO_2$ laser, in a vibrational mode, (c) the chemical species can be obtained in a gas state, at a temperature below the decomposition temperature.

Fine particle refractory oxide powders are used in a variety of industries. For example, they can be sintered to form ceramic objects; they can be used for coating substrate by slurry coating techniques; they can be used as the dispersoid in oxide dispersion strengthened alloys; or they can be used, in ultra-high purity form, in the electronics industry. In many applications, it is desirable that the powder be composed of very fine particles (about 1 m in diameter or less) to enhance sintering processes or to improve the homogeneity of dispersions in other materials.

Various techniques exist for producing refractory oxide powders including hydrolysis methods and conventional pyrolysis methods. W. R. Cannon et al has disclosed a laser-heated gas phase synthesis process to produce sinterable ceramic powders of silicon-containing solids, see e.g., Cannon, W. R.; Danforth, S. C.; Flint, J. H.; Haggerty, J. S.; Marra, R. A.; *J. Am. Ceram. Soc.,* 1982, 65, 324–330. However, there is still a need in the art for methods of producing ultra-fine refractory oxide powders and metals both in pure form and as homogeneous solid solutions of multiple compounds.

SUMMARY OF THE INVENTION

In accordance with the present invention, there is provided method for producing refractory oxide powders by pyrolyzing, with laser energy, boron-, silicon-, or metal-containing organic chemical species or mixtures of such species, characterized by the following properties: (a) some or all of the organic fragments (ligands) are bound to the boron-, silicon-, or metal by one or more boron-, silicon-, or metal-oxygen bonds; (b) the chemical species are able to absorb laser energy, preferably from a $CO_2$ laser, in a vibrational mode; (c) the chemical species can be obtained in a gas state, at a temperature below the decomposition temperature. Hereinafter, for convenience, "boron, silicon or metal" shall be referred to only as "metal". It is understood that "metal" shall be used in a broader sense to include boron, silicon or a metal.

In preferred embodiments of the present invention, the chemical species is a binary alkoxide of boron, silicon, aluminum, a metal from Group II (Be, Mg, Ca, Sr, Ba) or of a transition metal selected from the group consisting of Groups III (Sc, Y, La), IV (Ti, Zr,Hf) V (V, Nb, Ta) and VI (Cr, Mo, W) of the Periodic Table of Elements and the laser energy is provided by a $CO_2$ laser. In another preferred embodiment, the invention may be practiced using other metal containing organic species, such as metal acetylacetonate.

DETAILED DESCRIPTION OF THE INVENTION

Figure 1:
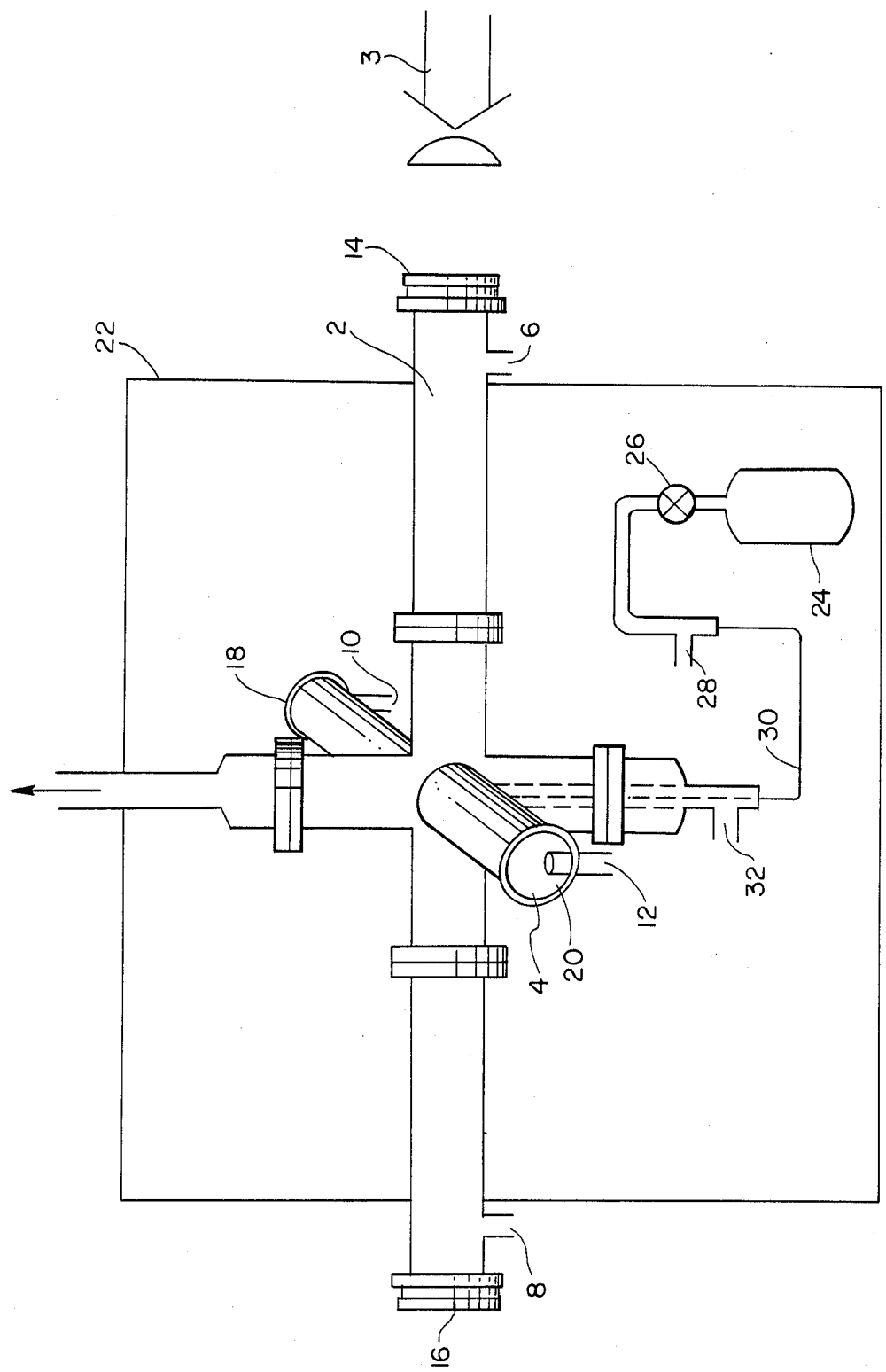

Non-limiting examples of the metal-containing organic chemical species which may be used in producing the powders hereof are the metal alkoxides. The metal component will be selected from those metals whose negative free energy formation of the oxide per gram atom of oxygen at about 25° C. is at least about 90,000 calories and whose melting point is at least about 1300° C. Preferably, the metal is selected from the group consisting of boron, silicon, aluminum, a metal from Group II or the transition metals from Groups III, IV, V, or VI of the Periodic Table of the Elements, as illustrated on the inside covers of the Handbook of Chemistry and Physics. More preferred metals include those of the titanium triad.

Preferably the alkoxide ligand used herein contains from 1 to 5 carbon atoms, most preferably 3 to 4 carbon atoms. Of course, the actual number of carbon atoms is not critical, other than for economical purposes, as long as in the particular compound: (a) some or all of the organic fragments (ligands) are bound to the metal by one or more metal-oxygen bonds; (b) the chemical species is able to absorb laser energy, preferably from $CO_2$ laser, in a vibrational mode; (c) the chemical species can be obtained in a gas state, at a temperature below the decomposition temperature. In practice, the oxygen-containing ligands are chosen to optimize the volatility of the metal-containing organic species. When the metal is titanium the preferred allkoxide ligand is the isopropoxide, while for zirconium, the preferred ligand is the tertiary butoxide; these ligands yield the maximum volatility for the respective metal alkoxides. With the alkoxide ligands, the $CO_2$ laser energy is absorbed by the carbon-oxygen stretching vibration which occurs at about 1000 $cm^{-1}$, with little change in the position when the ligand or the metal is altered. For some metals, it is preferable to employ fluorinated alkoxide ligands in order to obtain sufficient vapor pressure of the reactant to practice the invention conveniently.

Although metal alkoxides are the most preferred reactants when a compound of sufficient vapor pressure is available for the particular metal to be incorporated in the refractory metal oxide powder, there are metals for which even fluorinated alkoxides have insufficient vapor pressure to practice the invention conveniently. In those cases, it is preferable to employ acetylacetonate or fluorinated acetylacetonate ligands in order to obtain convenient vapor pressure of the reactant. When acetylacetonate ligands are present, the $CO_2$ laser energy may be absorbed by the methyl rocking or carbon-carbon stretching vibrations of the ligands at about 1030 and 935 $cm^{-1}$, respectively.

The metal-containing chemical species may be at any gaseous pressure convenient for the instant process. However, more preferred are volatile compounds having a vapor pressure of at least 100 torr at a temperature before they decompose.

Any laser source may be used in the practice of the present invention as long as it is capable of generating enough power intensity to instantaneously decompose the metal-containing organic species. Generally, the power intensity will be between about 400 and 4,000 $W/cm^2$. Most preferred are $CO_2$ lasers because of their high conversion efficiency of electricity to light, their high power and their demonstrated tunability over a large number of emission lines between the wavelengths of 9 and 11 μm.

In the practice of the present invention, the metal-containing organic species is passed into a reaction cell, preferably manufactured from stainless steel and maintained at a temperature which will maintain the metal-containing organic species in a gaseous state. This temperature will be from ambient to about 250° C., with the upper limit imposed by the decomposition temperature of the particular species employed.

The pyrolysis of the reactant gas is performed in the reactor shown in FIG. 1. A $CO_2$ laser beam enters the reactor, preferably through a KCL or ZnSe window, at such an intensity as to cause decomposition of the metal-containing organic species. The resulting vapor is supersaturated with respect to the metal oxide, so fine particles of the metal oxide are produced by rapid nucleation and growth processes. The reaction time is between about 5 and 50 msec, dependent upon the linear flow rate of the reactant, the diameter and intensity of the laser beam and the kinetics of the decomposition of the reactant. The pyrolysis produced solid particles, either crystalline or amorphous, which are wholly or predominantly the desired oxide. The gaseous by-products include numerous small hydrocarbon molecules from the organic ligands. The solid particles are collected on a filter, or by other methods, for subsequent use.

A major advantage of laser pyrolysis over more conventional pyrolytic synthesis methods is that the very short time scale (rapid heating and cooling) largely prevents segregation of reactants due to differential reaction rates during the pyrolysis. In many applications it is desirable to employ refractory metal oxides which contain more than one metal; an example is the addition of other oxides to zirconia to prevent the otherwise deleterious monoclinic to tetragonal phase transition near 1000° C. Pyrolysis of mixtures of metal alkoxides, with slow heating rates, would lead to severely inhomogeneously mixed metal oxides when decomposition temperatures of the reactants differed significantly. The advantage of laser pyrolysis is that the decomposition reactions are very fast, and particle growth from the supersaturated gas of metal oxide precursors is not selective toward different metals. Because of this, refractory metal oxide powders produced by laser pyrolysis of mixtures of metal alkoxides will not have compositional differences from particle to particle and will be nearly homogeneously mixed within individual particles.

EXAMPLE

The present invention will be illustrated and described with respect to preparing titanium dioxide from titanium isopropoxide.

The reaction cell used for the titanium isopropoxide gas pyrolysis study is shown in FIG. 1. The cell was constructed around a mini-flange 6-way cross. As shown in the Figure, the vertical axis of the apparatus was used for introduction of reactants and take-off of products. One horizontal axis 2 was used for passage of the laser beam 3, while the remaining horizontal axis 4 was used for viewing the reaction zone. Again inlets 6, 8, 10 and 12 were provided near each of the four windows 14, 16, 18 and 20 to prevent deposition of particulates on the windows. Two of the windows 14 and 16 were KCl windows. This argon gas was introduced directly, with no preheating.

The entire cell, except the flanges which held the KCl windows 14 and 16 was enclosed in an oven 22, with a maximum temperature capability of about 250° C.

Figure 2:
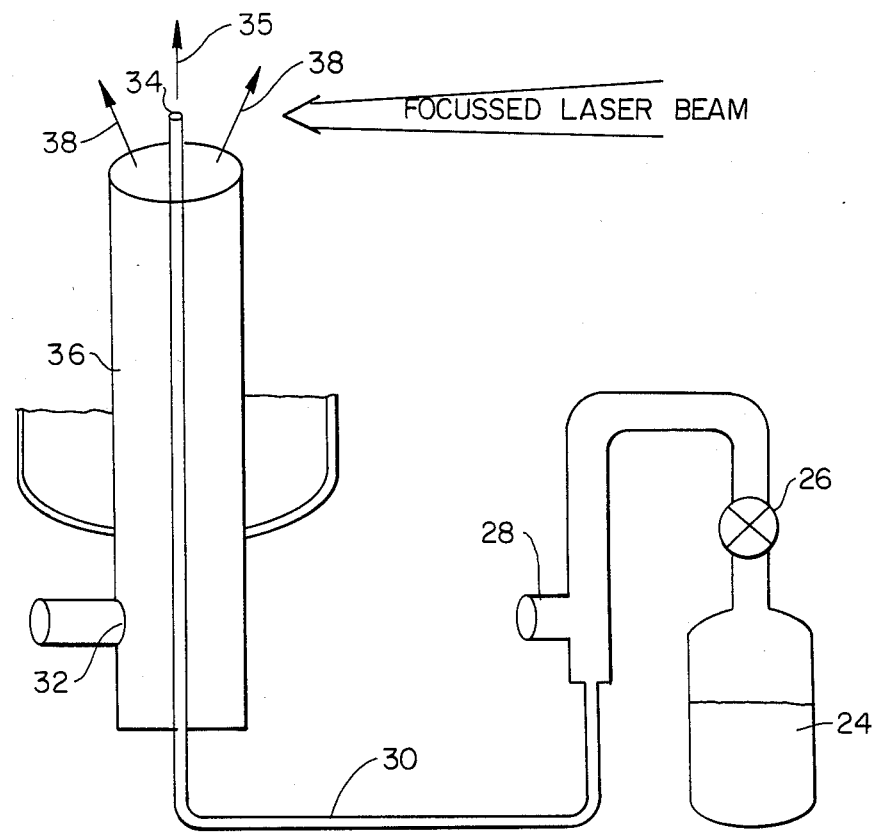

From the overall apparatus shown in FIG. 1, a detail of the section used to provide the reactant gas flow is shown in FIG. 2. The titanium isopropoxide reactant was contained in a stainless steel sample reservoir 24 inside the oven. Oven temperatures of 190°–240° C. were employed to assure adequate vapor pressure. [The normal boiling point of titanium isopropoxide is 220° C., see Bradley, D. C.; Metrotra, R. C.; Wardlaw, W.; *J. Chem. Soc.* 1952, 5020–5023.] The alkoxide vapor flow was controlled by a needle valve 26 on the reservoir. This vapor passed through a 10 cm section of ¼ inch stainless steel tubing to a tee 28 where it was optionally mixed with a second reactant gas. When a second gas was introduced, the flow was controlled by a needle valve external to the oven. This added gas was preheated in a 3 meter coil ⅛" stainless steel tubing contained in the oven. The preheating was required to prevent condensation of the alkoxide vapor by contact with a stream of cold gas.

The reactant gases passed from the tee 28 through a section of 1/16" tubing (1 mm i.d.) 30 where, because of the small diameter, mixing of the gases should be very efficient. This small tubing passed through a tee fitting 32 and continued into a concentric ¼" tube to a point 34 1–4 mm below the focus 35 of the laser beam, as shown in FIG. 2. The outer tube 36 was used to provide an argon stream 38 which surrounded the reactant stream and was coaxial to it. The argon was preheated in a 7 m coil of ⅛" tubing before entering the tee 32. The argon minimized spreading and turbulence of the reactant gas stream in the reaction zone. The velocities of the reactant stream and the coaxial argon stream were matched so that there was no turbulance at the argon/reactant interface, and the streams remained coaxial well beyond the terminus of the tubes. Any turbulent mixing of the entering gases with gases in the reactor then occurred at the argon/argon interface between the coaxial argon stream and the argon flows entering the reactor down the reactor side-arms from the windows.

The gas flows were arbitrarily adjusted for an optimum flame shape and brightness. Several considerations entered into such adjustments. First, the reactant stream had to move slowly enough to attain reaction temperature during the residence time in the beam. Increasing the alkoxide flow rate, for example, was observed to "blow out" the laser driven flame at high gas velocities. Second, the coaxial argon stream was set to give a flame with minimal spreading. At very low flow rates, the reaction zone became a thread-like line along the laser beam, extending 1–3 cm each way from the reactant inlet. This not only indicated serious spreading of the reactant stream, but bright sparkles in the beam showed that some reprocessing of the formed powders was occurring due to turbulence in the cell. Third, the argon flows provided to the window inlets were set high enough to prevent any particulates from depositing on the windows. Finally, the pumping rate was adjusted to obtain the desired cell pressure.

The flow rates of the gases employed, excepting that of the titanium isopropoxide, were measured outside the oven. The coaxial argon stream was 85 SCCM [SCCM = cubic centimeters per minute at standard temperature and pressure, 273° C. and 760 torr.] The total argon flow to the four inlets near the reactor cell windows was also 85 SCCM.

In the laser synthesis reactor, the important gas flow parameter is not the reactant gas flow rate in volume per unit time, but rather the flow velocity in distance per unit time at the laser beam. It is this velocity which governs the residence time of the reactants in the laser beam. The velocities can be calculated from the cross sections of the gas streams. The apparatus shown in FIG. 2 had a reactant tube 0.1 cm i.d. and 0.16 cm l.d., while the coaxial argon source tube was 0.5 cm i.d. From the opening area of 0.176 cm$^2$ for the argon source tube and an argon flow rate of 85 SCCM, [corrected to 280 cm$^3$/min at 400 torr and 200° C.] the argon flow velocity was 26 cm/sec; the reactant stream velocity was approximately matched to this. With the laser beam diameter of 0.6 cm, the residence time of material in the beam was thus about 20 msec.

The reactor cell pressure was adjusted by controlling the pumping rate at the vacuum take-off. The take-off passed through a powder collection filter with a filter pore size of 0.5. Laser pyrolysis reactions were conducted with a laser power of 20–150 W.

Analysis of a typical product gave: Ti, 56.21%, C, 3.40%, H, 0.69%, O [by difference], 39.20%. The corresponding formula is $TiO_{2.08}C_{0.28}H_{0.58}$.

What is claimed is:

1. A continuous process for producing refractory oxide powders comprising:
   (a) obtaining a boron, silicon or metal containing compound including organic components in a gaseous state below its decomposition temperature such that the organic components are bound to the boron, silicon or metal by one or more boron, silicon or metal oxygen bonds,
   (b) irradiating said compound in the substantial absence of elemental oxygen with a laser such that the energy is absorbed in a vibrational mode at such an intensity so as to cause pyrolytic decomposition in a continuous manner, in the substantial absence of exothermic chemistry, so as to produce a refractory oxide powder, and
   (c) collecting said refractory oxide powder.

2. The process of claim 1 wherein said obtaining step is performed such that said compound is a binary alkoxide or binary fluorinated alkoxide of an element selected from the group consisting of boron, silicon aluminum, a metal from Group II (Be, Mg, Ca, Sr, Ba), a transition metal from Group III (Sc, Y, La), a transition metal from Group IV, (Ti, Zr, Hf), a transition metal from Group V (V, Nb, Ta) and a transition metal from Group VI (Cr, Mo, W).

3. The process of claim 2 wherein said alkoxide is a titanium alkoxide.

4. The process of claim 3 wherein said metal alkoxide is $Ti[OCH(CH_3)_2]_4$.

5. The process of claim 4 wherein said refractory oxide is titanium dioxide.

6. The process of claim 6 wherein said alkoxide has a vapor pressure above 100 torr at temperature below the decomposition temperature.

7. The process of claim 1 wherein said obtaining step is performed such that said compound is selected from either a metal acetylacetonate or a metal fluorinated acetylacetonate.

8. The process of claim 1 wherein said laser has a power intensity between 400 and 4,000 W/cm$^2$.

9. The process of claim 1 wherein said alkoxide contains from 1 to 5 carbon atoms.

10. The process of claim 9 wherein said aloxide contains from 3 to 4 carbon atoms.

11. The process of claim 1 wherein said laser is a $CO_2$ laser.

* * * * *